United States Patent

Hasegawa et al.

[15] 3,673,580

[45] June 27, 1972

[54] INFORMATION STORAGE SYSTEM

[72] Inventors: Kohichi Hasegawa; Norihiko Kunishima, both of Tokyo, Japan

[73] Assignee: Nippon Electric Company Limited, Tokyo, Japan

[22] Filed: Oct. 16, 1970

[21] Appl. No.: 81,493

[30] Foreign Application Priority Data

Oct. 25, 1969 Japan....................................44/85361

[52] U.S. Cl...............340/174 PC, 340/174 M, 340/174 LA, 340/174 DA

[51] Int. Cl.......................................G11c 5/02, G11c 11/06

[58] Field of Search...............340/174 PC, 174 LA, 174 DA, 340/174 M

[56] References Cited

UNITED STATES PATENTS 3,390,383 6/1968 Snyder............................340/174 DA
3,504,356 3/1970 Patel et al.......................340/174 DA
3,293,626 12/1966 Thome............................340/174 DA

*Primary Examiner*—Stanley M. Urynowicz, Jr.
*Attorney*—Marn & Jangarathis

[57] ABSTRACT

A two-line information storage system including read-out and write-in driver circuits, a word selection circuit for producing address output signals, a digit sense decoder for producing output signals to select one of the read-out or write-in circuits at a given time, an output amplifier, a plurality of pairs of signaling transmission lines interconnecting the read-out and write-in driver circuits and containing a plurality of memory elements for producing sensed output signals in response to the word selection circuit output signals and direct current flowing in a selected one line pair, and a plurality of unidirectional diodes connecting the output ends of the respective line pairs to the amplifier input for transmitting the sensed signals thereto from one line pair while blocking the transmission of the direct current and the sensed signals from the one line pair to the other line pair.

6 Claims, 3 Drawing Figures

INVENTORS
Kohichi Hasegawa
Norihiko Kunishima
BY
Marn & Jangarathis
ATTORNEYS

INVENTORS
Kohichi Hasegawa
Norihiko Kunishima
BY
Marn & Jangarathis
ATTORNEYS

INVENTORS
Kohichi Hasegawa
Norihiko Kunishima
BY
Marn & Jangarathis
ATTORNEYS

INFORMATION STORAGE SYSTEM

DETAILED DESCRIPTION OF THE INVENTION

This invention relates to write-in and read-out circuits for a two-line type information storage system.

The digit write-in and read-out circuits of the conventional memory system of this type, and especially of large capacity, is divided into two or four categories. In such a conventional memory system, therefore, the read-out circuit is used for the low-level selection circuit and the digit drive circuit side is used for the selection matrix circuit. In the conventional system, therefore, it is necessary to operate the gate circuits provided as many as the number of divided digit write-in and read-out circuit portions, where these selection matrix circuits and low-level selection circuits are provided separately. This results in an increase in the number of circuit elements, making the system costly to manufacture and affecting its reliability.

It is therefore the object of the present invention to provide the information storage system of this type, simplified in circuit configuration, less costly to manufacture and suited for minimization.

The invention will be described in conjunction with the accompanying drawings.

Figure 1:
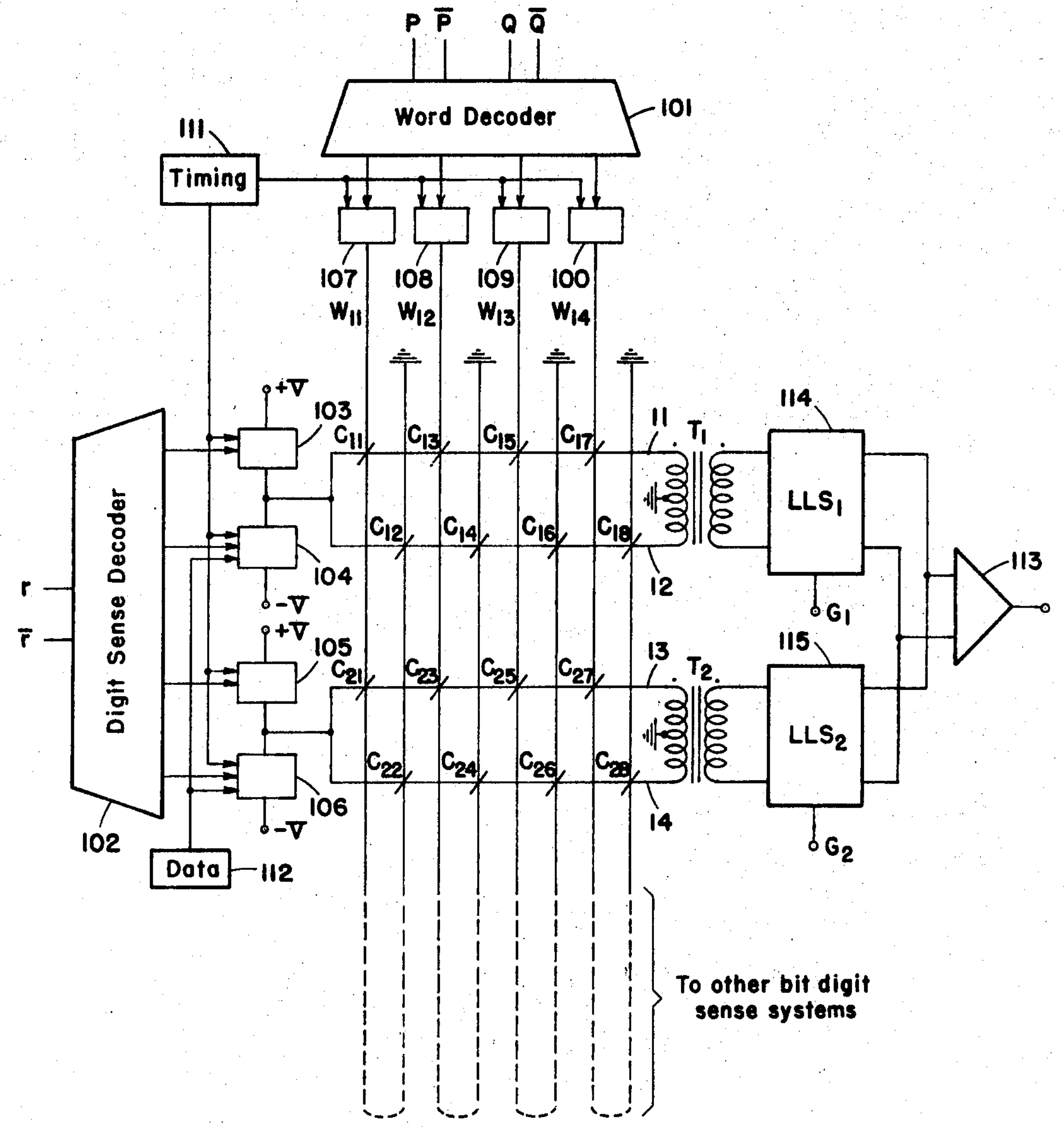
FIG. 1 is a schematic diagram illustrating a conventional two-line storage system.

In FIG. 1 which shows a conventional two-line memory system wherein the word selection circuit is divided into four circuit groups and the digit-sense selection circuit is divided into two groups. The word selection circuit comprises a word decoder 101 for decoding pulses representing true and complement values P, $\overline{P}$, Q and $\overline{Q}$ for the two bits of address P and Q. Similarly, word drivers 107, 108, 109 and 110 for supplying currents, in response to the control of the outputs supplied from the word decoder and timing 111, to word lines $W_{11}$, $W_{12}$, $W_{13}$ and $W_{14}$, respectively. The word drivers are further controlled by another address bit so as to supply current of both positive and negative polarities on the read-out and write-in phase, respectively.

The digit-sense circuit comprises a digit-sense decoder 102 for decoding true and complement value pulses r and $\overline{r}$ for a bit of address, and digit drivers 103, 104, 105 and 106 for supplying currents, under the control of the outputs of the decoder and timing 111, to digit-sense lines 11, 12, 13 and 14, respectively. The digit driver circuits 103, 104, 105 and 106 may be used for either read-out or write-in.

In the circuit of FIG. 1, the digit driver circuits 103 and 105 serve as read-out driver circuits while the digit driver circuits 104 and 106 serve as write-in drivers, the former and the latter being connected to power supplies +V and −V, respectively. The write-in driver circuits 104 and 106 are further connected to a data source 112. The digit-sense lines 11 and 12, as well as 13 and 14, are connected together at one side ends, which in turn are connected to the digit driver circuits 103, 104, 105 and 106, respectively. The other ends of the digit-sense lines 11, 12, 13 and 14 are connected to transformers $T_1$ and $T_2$ each having a grounded mid-point, with the secondary windings of the transformers $T_1$ and $T_2$ being connected to low-level selection circuits 114 and 115. The outputs of the low-level selection circuits 114 and 115 are connected in parallel and then to a sense amplifier 113.

When a core $C_{11}$ is to be selected in the read-out operation, the digit-sense decoder 102 selects the read driver circuit 103, causing substantially equal currents to flow from the power supply +V through the digit-sense lines 11 and 12 to both terminals of the transformer $T_1$, the mid-point tap, and then to ground. Meanwhile, the word decoder 101 selects the word driver circuit 107 to supply a current to the word line $W_{11}$, which coincides with the current supplied from the read driver circuit 103 to set up the sum magnetic field in the core $C_{11}$, thereby generating a sensed signal. This signal is then transmitted to the secondary winding of the transformer $T_1$, passing through the low-level selection circuit 114 which is now opened by a gate signal $G_1$ to reach the input of the sense amplifier 113. At this moment, the low-level selection circuit 115 remains closed to present a high impedance to the input signal towards the sense amplifier 113, thus preventing interference. On the contrary, when the low-level selection circuit 115 is opened by a gate signal $G_2$, the low-level selection circuit 114 is closed, and the signal from the transformer $T_2$ is thus caused to pass to the input of the sense amplifier 113.

If the polarity of the current from the word driver circuit 107 is opposite to that of the above case, magnetic fields are added together in a core $C_{12}$, the stored content of which is then read out.

When information is now to be written into the core $C_{11}$, the digit-sense decoder 102 selects a write driver 104. If the data 112 is "1", the power supply −V supplies substantially equal currents to digit-sense lines 11 and 12. Meanwhile the word decoder 101 selects the word driver 107 causing a current to flow through the word line $W_{11}$, which coincides with the current from the write driver 104 to write "1" information into the core $C_{11}$. In this case, too, either core $C_{11}$ or $C_{12}$ is selected in accordance with the polarity of the word current. If, on the contrary, the data is "0", the write driver 104 supplies no current, but the word driver 107 is selected to supply a current to the word line $W_{11}$, thereby writing "0" information into the core $C_{11}$.

In the conventional information storage system shown in FIG. 1, the selection of the read driver circuits 103 and 105 as well as the selection of the low-level selection circuits 114 and 115 is done by the same decode pulse to switch simultaneously both digit driver circuits and low-level selection circuits, with some functions overlapping.

Figure 2:
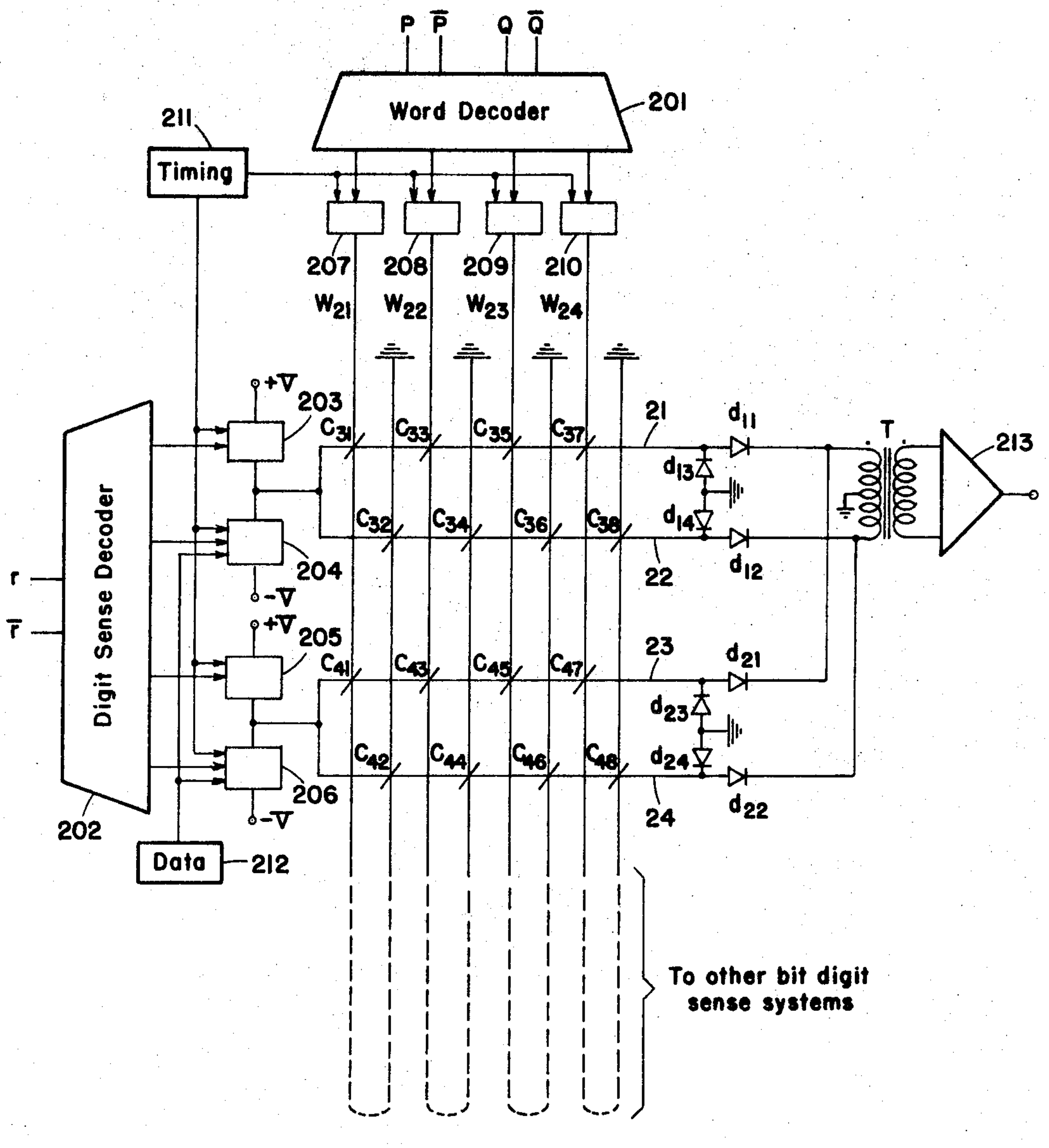
FIG. 2 is a schematic diagram illustrating an embodiment of this invention.

An embodiment of the present invention will now be described with reference to FIG. 2, in which the anodes of diodes $d_{11}$, $d_{12}$, $d_{21}$ and $d_{22}$ as well as the cathodes of diodes $d_{13}$, $d_{14}$, $d_{23}$ and $d_{24}$ are connected to digit-sense lines 21, 22, 23 and 24, respectively, at one side ends opposite to those which are connected to driver circuits 203, 204, 205 and 206. The cathodes of the diodes $d_{11}$ and $d_{12}$ as well as those of the diodes $d_{21}$ and $d_{22}$ are connected in common to the primary winding of a transformer T having a grounded mid-point, while the anodes of the diodes $d_{13}$, $d_{14}$, $d_{23}$ and $d_{24}$ are connected to the ground. The secondary winding of the transformer T is connected to a sense amplifier 213. The structure and operation of word decoder 201, digit-sense decoder 202, timing 211 and data 212 are similar to those of FIG. 1 and will not be described any further. A substantially equal amount of current is caused to flow from the read driver 203 through the digit-sense lines 21 and 22, and to pass through the diodes $d_{11}$ and $d_{12}$, to the mid-point (ground) of the primary winding of the transformer T. If, at the same time, a current is supplied to the word drive line $W_{21}$, information is read out of the core $C_{31}$ through the current coincidence. This read-out information becomes an input to the sense amplifier 213 which is connected to the secondary winding of the transformer T. The read-out signals on the digit-sense lines 21 and 22 are prevented from being transmitted to the other digit-sense lines 23 and 24 by the diodes $d_{21}$ and $d_{22}$. Accordingly, the impedance seen from the sense amplifier 213 is substantially the same as that obtained in the case where the digit-sense lines 21 and 22 alone are connected, and the information signal can be picked up in the secondary winding of the transformer T with little dissipation. On the contrary, when the read-out driver 205 is energized the diodes $d_{21}$ and $d_{22}$ become conductive, while the diodes $d_{11}$ and $d_{12}$ show high impedance to keep the digit-sense lines 21 and 22 open, thereby achieving the signal transmission through the impedance of virtually only a single circuitry.

When information is to be written into the core $C_{31}$, the date "1", the digit-sense decoder selects the write driver 204. This causes substantially equal currents to flow, picking up ground from the anode-side junction point of the diodes $d_{13}$ and $d_{14}$, from the diode $d_{13}$ through the digit-sense line 21, as well as from the diode $d_{14}$ through the digit-sense line 22, to the write-in driver circuit 204, terminating into the power supply −V. Meanwhile the word decoder selects the word driver 207 to supply the word line $W_{21}$ with a current, which coincides with that from the write driver 205 to write information "1" into the core $C_{31}$. If the data is "0", the write driver 204 supplies no current, and the word line $W_{21}$ only is supplied with a current to write "0" information into the core $C_{31}$.

Figure 3:
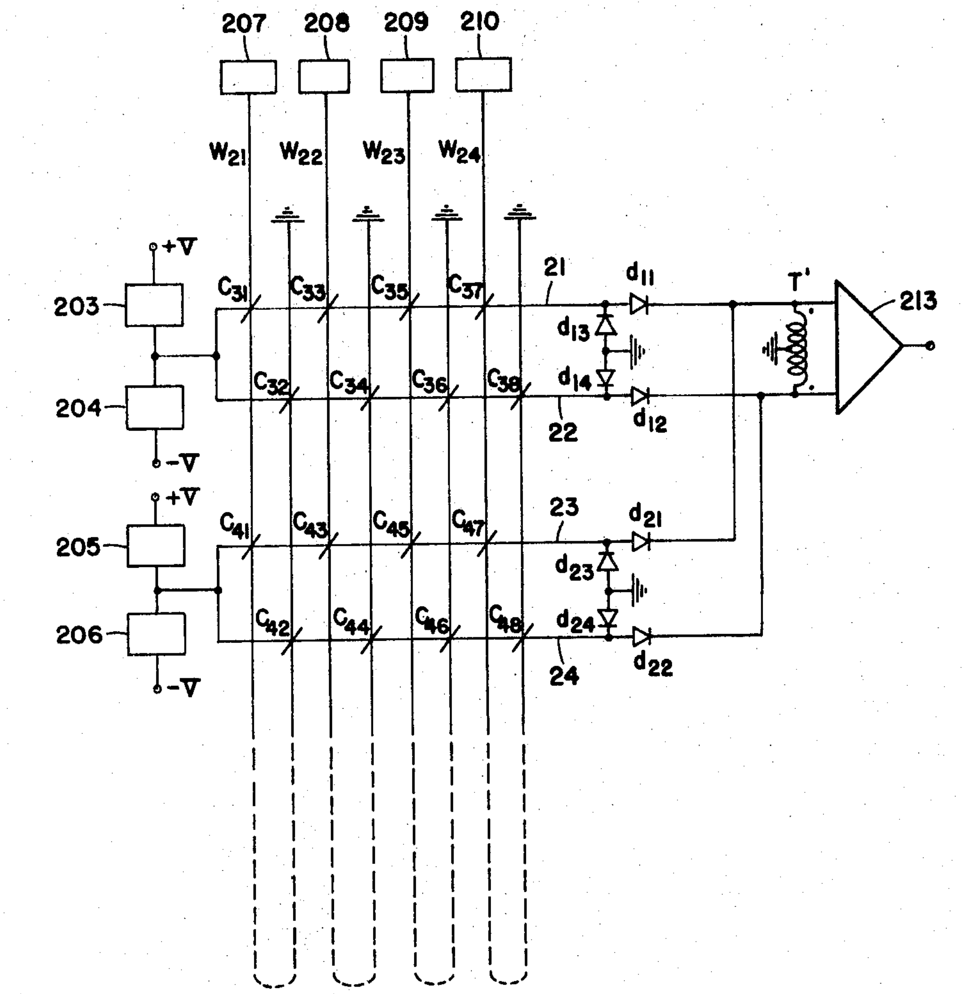
FIG. 3 is a schematic diagram illustrating another embodiment of this invention.

Another embodiment of this invention is shown in FIG. 3, in which an autotransformer T′ permits the digit drive currents to flow into the mid-point (ground), but presents a high impedance to the information signals read out of the cores, thereby passing waveforms without substantial attenuation to the sense amplifier input. The functions of the other components are similar to those of FIG. 2.

Although the invention has thus far been described with regard to magnetic core memories, it is applicable to any other two-line memory elements as well. Further, FIGS. 2 and 3 show the cases of two parallel digit-sense lines connected to a transformer, but it is evident that this invention is equally applicable to the cases of three or more parallel circuits.

To summarize, this invention provides the common use of diodes of high reliability as a digit drive selection circuit and a low-level selection circuit and thus permits the production of an economical and highly reliable memory system.

What is claimed is:

1. A two-line information storage system, comprising:

a generator of timing signals;

word selection circuit means activated by said timing signals and a preassigned input address signal for providing a predetermined one of a plurality of output signals;

a source of "1" signals;

a digit sense decoder activated by another preassigned input signal for providing a predetermined one of a plurality of output signals;

a plurality of pairs of write-in and read-out driver circuits, each having a first input connected to one of said decoder outputs and a second input connected to said timing generator; said write-in driver circuits having third inputs connected to said signal source and fourth inputs connected to a negative current supply; said read-out driver circuits having third inputs connected to a positive current supply;

a plurality of pairs of digit-sense lines, each line including a plurality of memory elements; a first of said line pairs having corresponding first ends connected to outputs of a first pair of said write-in and read-out driver circuits and a second of said line pairs having corresponding first ends connected to outputs of a second pair of said write-in and read-out driver circuits;

a sensed signal amplifier;

transformer means including a winding having a grounded midpoint and opposite terminals connected to an input of said amplifier;

and unidirectional means for controlling current transmission in said first and second line pairs, including:

a plurality of pairs of unidirectional means poled in a predetermined direction for connecting corresponding other ends of each of said first and second line pairs to said transformer winding respective opposite terminals in such manner that first and second pairs of said unidirectional means connect said opposite ends of said first and second line pairs, respectively, to said transformer winding opposite terminals; said decoder one output signal selecting one of said read-out driver circuit as connected to a corresponding one of said line pairs as controlled by said decoder output signal and said timing signals to cause current to flow in a circuit containing said positive current supply, said selected read-out driver circuit, said last-mentioned one line pair, a corresponding one of said first and second unidirectional means pairs as converted to said last-mentioned one line pair, said transformer winding and ground to energize said memory elements included in said last-mentioned one line pair; said word selection means one output signal energizing a corresponding one of said memory elements in said last-mentioned one line pair to produce at said last-mentioned one element a sensed signal current which is transmitted in another circuit including said last-mentioned one memory element, said last-mentioned one line pair, said one unidirectional means pair connected to said last-mentioned one line pair and said transformer winding to said amplifier input while at the same time the other of said first and second unidirectional means pairs as connected to said second line pair blocks the transmission of said positive supply current and said sensed signal current from said last-mentioned one line pair to said second line pair.

2. The system according to claim 1 in which each of said first and second unidirectional means pairs consists of two diodes, each having an anode and a cathode; said first diode pair so poled as to connect said cathodes thereof to said transformer winding respective opposite terminals and said anodes thereof to said other ends of said respective lines in said first pair thereof; said second diode pair so poled as to connect said cathodes thereof to said transformer winding respective opposite terminals and said anodes thereof to said other ends of said respective lines in said second pair thereof.

3. The system according to claim 2 in which said current controlling unidirectional means includes another plurality of pairs of unidirectional means poled in a further predetermined manner for connecting ground to points between said memory elements and said first and second unidirectional means pairs at said other ends of said respective lines in said first and second pairs thereof in such manner that third and fourth pairs of said another unidirectional means pairs connect said points in said first and second line pairs, respectively, to ground; said decoder actuated by a further preassigned input signal for providing a further predetermined one of said plurality of output signals to select a corresponding write-in driver circuit connected to a corresponding one of said line pairs as controlled by said decoder further predetermined output signal and said timing signals to cause current to flow in a further circuit including ground, a corresponding one of said third and fourth unidirectional means pairs as connected to said last-mentioned one line pair, said last-mentioned one line pair, said selected write-in driver circuit and said negative current supply to energize said memory elements included in said last-mentioned one line pair when a "1" signal of said signal source is selected for write-in in one of said last-mentioned memory elements.

4. The system according to claim 3 in which each of said third and fourth unidirectional means pairs consists of two diodes, each having an anode and a cathode; said third and fourth diode pairs so poled that said cathodes thereof are joined to said points in said respective lines in said first and second line pairs, respectively, and said anodes thereof are joined to ground.

5. A two-line information storage system, comprising:

a generator of timing signals;

word selection circuit means activated by said timing signals and a preassigned input address signal for providing a predetermined output signal;

a source of "1" signals;

a digit-sense decoder activated by a second preassigned input signal for providing a predetermined output signal;

a plurality of pairs of write-in and read-out driver circuits, each having a first input connected to one of said decoder outputs and a second input connected to said timing generator; said write-in driver circuits having third inputs connected to said signal source and fourth inputs connected to a negative current supply; said read-out driver circuits having third inputs connected to a positive current supply;

a plurality of pairs of digit-sense lines, each line including a plurality of memory elements; a first of said line pairs having corresponding first ends connected to outputs of a first pair of said write-in and read-out driver circuits and a second of said line pairs having first corresponding ends connected to outputs of a second pair of said write-in and read-out driver pairs;

a sensed signal amplifier;

transformer means including a winding having a grounded midpoint and opposite terminals connected to an input of said amplifier;

and unidirectional means for controlling current transmission in said first and second line pairs, including:

first and second pairs of diodes, each having an anode and a cathode; said first and second diode pairs having said cathodes thereof connected to said transformer winding opposite terminals and said anodes thereof connected to other ends of respective lines of said first and second line pairs, respectively;

whereby said decoder output signal selects one of said read-out circuits as connected to a corresponding one of said line pairs as controlled by said decoder one output signal and said timing signals to cause current to flow in a circuit including said positive current supply, said selected read-out driver circuit, said last-mentioned one line pair, a corresponding one of said first and second diode pairs as connected to said last-mentioned one line pair, said transformer winding and ground to energize said memory elements included in said last-mentioned line pair while the other of said first and second diode pairs blocks the transmission of said positive supply current from said circuit into the other of said line pairs; said word selection means output signal energizes a corresponding one of said memory elements in said last-mentioned one line pair to produce at said last-mentioned one element a sensed signal which is transmitted in another circuit including said last-mentioned one element, said last-mentioned one line pair, said one of said first and second diode pairs and said transformer winding to said amplifier input while said other of said first and second diode pairs blocks the transmission from said sensed signal from said last-mentioned one line pair into the other of said line pairs.

6. The system according to claim 5 in which said unidirectional means includes third and fourth pairs of diodes, each having an anode and a cathode; said third and fourth diode pairs having said cathodes thereof connected to said other ends of said respective lines at points located between said memory elements and said respective first and second diode pair anodes in said first and second line pairs, respectively; said third and fourth diode pairs having said anodes thereof connected to ground; whereby said decoder activated by a further preassigned input signal provides a further predetermined output signal to select a corresponding write-in driver circuit connected to a corresponding one of said line pairs as controlled by said decoder further predetermined output signal and said timing signals to cause current to flow in a further circuit including ground, a corresponding one of said third and fourth diode pairs as connected to said last-mentioned one line pair, and said selected write-in driver circuit to said negative current supply to energize said memory elements included in said last-mentioned one line pair when a "1" signal of said signal source is selected for write-in in said last-mentioned memory element.

* * * * *